Nov. 25, 1958  F. S. BERGSTROM  2,861,326
METHOD OF MAKING PUNCH PLATE SCREENS
Filed Feb. 1, 1954
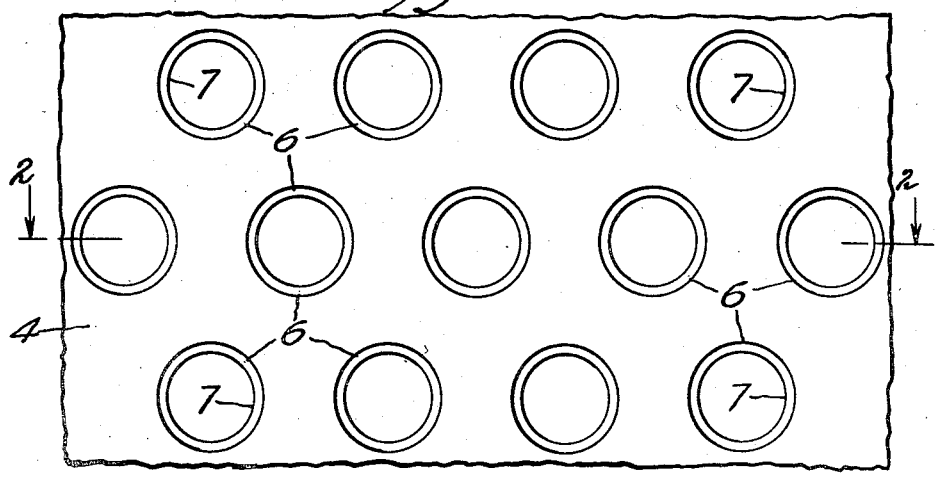
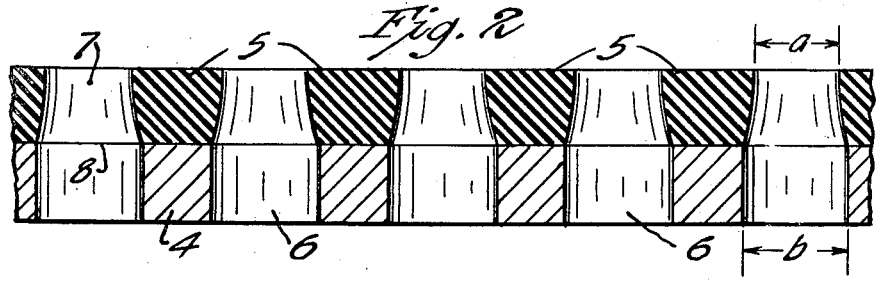
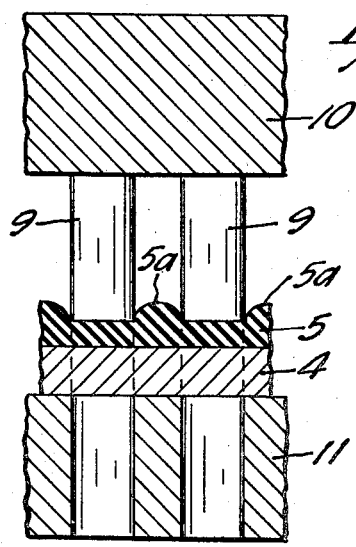 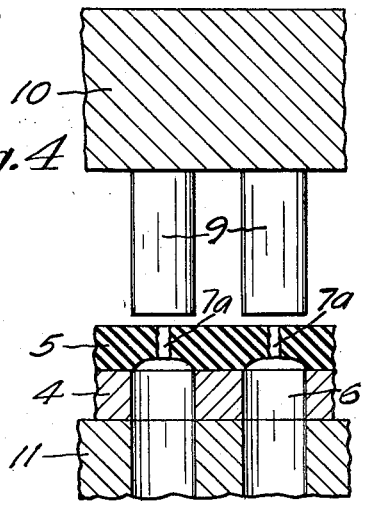
INVENTOR.
Frank S. Bergstrom
BY
John E. Strypker
ATTORNEY

2,861,326
METHOD OF MAKING PUNCH PLATE SCREENS

Frank S. Bergstrom, Eveleth, Minn., assignor to Drill Development Company, Biwabik, Minn., a corporation of Minnesota Application February 1, 1954, Serial No. 407,522

2 Claims. (Cl. 29—163.5)

This invention relates to a method of making punch plate screens for sizing and separating fine particles of abrasive material from relatively coarse material, and particularly to a method of making a screen of the laminated type comprising a supporting plate and a durable rubber or rubber-like sheet covering the normally upper face of the plate.

It is an object of my invention to provide a method of making a punch plate screen of the flexible, vibrating type which is rendered unusually durable and efficient by a foraminous facing of wear-resistant rubber or rubber-like material bonded to the normally upper side of a metal backing plate and formed with apertures of novel shape and proportions for the passage of the undersize material.

A particular object is to so proportion the thicknesses of the rubber facing and metal backing and the sizes and shapes of the surfaces defining the apertures therein as to minimize blinding and provide high screen efficiency combined with adequate rigidity and strength, the backing being constructed from a metal plate of hardness, strength and composition suitable for bonding to rubber facing material and for punching.

A further object is to provide a novel and economical process for so forming such screens as to provide apertures for the passage of the undersize particles in the flexible, wear-resistant facing which are substantially smaller at their upper ends than the apertures in the backing plate and enlarged to the same size as the plate apertures at the lower face of the rubber sheet.

A still further object is to provide a process for making an abrasion-resistant vibrating screen which comprises the steps of permanently bonding a durable rubber facing sheet to the normally upper surface of a steel or other hard metal plate, then forming a multiplicity of downwardly flaring perforations in the facing sheet and substantially straight perforations in the backing plate by a punching operation in which punch dies are forced successively through the facing sheet and then through the backing plate while compressing the facing sheet material at the sides of the perforations and utilizing the backing plate as a cutting die for the facing material.

Other objects will appear and be more fully pointed out in the following specification and claims.

Referring to the accompanying drawing which illustrates, by way of example and not for the purpose of limitation, a preferred embodiment of my invention:

Figure 1 is a fragmentary bottom plan view of my punch plate screen;

Fig. 2 is a fragmentary sectional view taken on the line 2—2 of Fig. 1;

Fig. 3 is a diagrammatic, fragmentary sectional view illustrating the effect of the punch die pressure on the resilient, compressible facing sheet at the start of the punching operation, and Fig. 4 is a diagrammatic, fragmentary sectional view illustrating the perforated screen at an intermediate stage in the process wherein the punch dies have been withdrawn upward after the first punching operation, preparatory to the finishing operation.

In the drawing, the numeral 4 indicates the supporting backing plate which is preferably constructed from mild steel or other suitable metal of the required hardness and strength and the numeral 5 indicates a sheet of flexible, wear-resistant rubber or rubber-like material which is adhered to the normally upper face of the plate 4 over the entire top surface thereof. The sheet 5 is preferably composed of a wear resistant rubber of composition similar to that employed in the treads of automobile tires, e. g., of approximately 60 durometer hardness. Tire tread rubber has a durometer hardness range of 57–62 inclusive. Such a sheet is adhered to the metal backing plate by vulcanization or by other suitable method for securely and permanently bonding the facing sheet to the backing.

The backing plate 4 is formed with a multiplicity of perforations 6 for the passage of the undersize material under treatment, these perforations being of cylindrical shape and spaced apart uniformly one from another and as closely together as is feasible consistently with retaining the strength and rigidity required to support the loads which are to be carried on the vibrating screen. Located in registry with each of the perforations 6 is a perforation 7 formed in the facing sheet 5. As best shown in Fig. 2, the diameter of each of the perforations 7 at the upper face of the sheet 5 is substantially smaller than the diameter of the perforations 6 and the elements of the surface defining each of these perforations 7 are convexly curved, being disposed to diverge downward to meet the upper end of the perforations 6 in the plate 4 at the junction plane 8. By this construction the apertures for the passage of the undersize material are so restricted at the upper face of the sheet 5 as to protect the metal surfaces defining the perforations 6 from the abrasive action of the material being treated.

Perforations of such uniquely beneficial shape are formed by one or more simple punching operations applied to the laminated blank after the blank rubber sheet 5 has been bonded to the upper face of the blank metal plate 4. A suitable punch press equipped with dies of somewhat larger diameter than the perforations required in the facing sheet 5 is used. As illustrated diagrammatically in Fig. 3, the punch press is provided with a multiplicity of dies 9 which project from a press head to simultaneously engage the exposed face of the sheet 5 when the laminated blank is supported on a female die plate 11. As indicated, the backing plate 4 is supported on the die plate 11 and the dies 9 are applied to the normally upper face of the sheet 5 and are forced through this sheet and then through the plate 4 to form the perforations 6 and 7.

As the pressure of the dies 9 is initially applied to the rubber or rubber-like material of the sheet 5, that material is compressed laterally or radially of each die and, due to the elasticity and relative softness of the sheet 5 and relative hardness of the plate 4, the sheet 5 is caused to project approximately as indicated at 5a. The sheet 5 remains under compression as the dies pass through it first and then through the plate 4. Due to the hardness of the plate 4 and its greater resistance to penetration by the punch dies, the rubber face sheet is perforated before the dies pass through the plate 4 and the rubber material is forced laterally out of the path of the dies before the dies break through the metal. This does not occur if the backing for the rubber is composed of a material which gives way and is carried into the female die openings by pressure of the male dies on the elastic rubber sheet before the holes in the latter have been cut through to the backing sheet or plate member.

With some types of rubber facing sheets a single operation of the press may be sufficient to complete the formation of the perforations 6 and 7. However, rubber compositions of maximum toughness and durability require a second operation of the punch press to form the perforations 7 defined by smooth downwardly flaring surfaces. As indicated in Fig. 4, the first punching operation forms in a rubber facing sheet of preferred durability, individual apertures 7a of minute size and defined by irregular, rough surfaces. To correct this and form smooth tapered openings 7 like those shown in Fig. 2 it is only necessary to operate the press a second time without changing the position of the work on the bed 11. During this second operation of the press the perforated backing plate constitutes the female die which coacts with the dies 9 to form the finished perforations 7. Small rubber plugs having smooth exterior surfaces and of annulus or toric shape are removed by the second operation of the press. After the second punching operation the material of the sheet 5 which was laterally compressed by the dies 9 expands and forms annular restricting projections substantially as shown in Fig. 2. The resulting surfaces defining the perforations 7 are smooth and substantially uniformly shaped, as shown, so that the passages for the undersize particles flare outward and downward to the junction 8 of the facing sheet with the backing plate.

My improved punch plate screen is particularly adapted for use as a vibrating screen in the treatment of abrasive materials and has been used with marked success in the separation of fine particles of ferro silicon from coarser particles of iron ore in a sink and float process for concentrating ores wherein granular ferro silicon is used as the solid constituent of the heavy separatory medium. The present invention has been used in this process to separate undersize particles of minus 2 millimeter sizes from the coarser material. It has been found that for such a screen 16 gauge mild steel may be used as the plate 4 and a sheet of wear resistant rubber of the character hereinbefore described of 1/16 inch thickness may be employed as the facing sheet 5. In the screen of this example the minimum diameter of the perforations 7, indicated by the dimension a (Fig. 2) is approximately 2 millimeters or .079 inch and the dimension b, representing the diameter of the cylindrical perforations 6 in the plate 4, is approximately .095 inch, thus providing a restriction equal to approximately .016 inch in the diameter of the perforations 7 at the upper face of the screen. By providing forty-seven of such perforations per square inch of area adequate strength is retained in the 16 gauge steel backing plate.

Such a screen has been found to give highly efficient results notwithstanding the fact that its theoretical efficiency is relatively low as compared with the all metal punch plate screens previously used for the same work. The improved operating efficiency of my screen is due to the fact that the tendency to "blind" or clog is greatly reduced as compared with such ordinary punch plate screens. This will be understood when it is considered that particles of such size as to enter the perforations 7 at the upper face of the sheet 5 are not likely to be held because the annular restriction is extremely limited in vertical extent. Thus the undersize particles pass freely through the enlarged lower portion of the perforations 7 into and through the larger perforations 6. Vibration and flexing of the narrow restricted zone of the passages further contributes to the freeing of the undersize particles. Since the particles pass through the perforations 6 without substantial friction, their abrasive effect on the cylindrical metal surfaces defining these perforations is minimized.

Suitable thicknesses and proportions of the metal plate and rubber facing sheet and corresponding sizes of the perforations are indicated within a practical range of screen sizes by the following examples:

| Ex. | Thickness | | Punch size | Plate hole size | Rubber hole size | Ratio rubber hole to plate hole | Holes per sq. in. or centers | Percent open area | |
|---|---|---|---|---|---|---|---|---|---|
| | Plate | Rubber | | | | | | Upper surface | Lower surface |
| 1 | .0598 | .0625 | .070 | .085 | .055 | 64.7 | 52 | 12 | 30 |
| 2 | .0598 | .0625 | .078 | .095 | .062 | 65.3 | 47 | 14 | 34 |
| 3 | .0747 | .0625 | .095 | .100 | .079 | 79.0 | 47 | 23 | 36 |
| 4 | .1196 | .125 | .125 | .135 | .090 | 66.7 | 7/32 | 15 | 34 |
| 5 | .1196 | .125 | .156 | .165 | .124 | 75.2 | 1/4 | 22 | 39 |
| 6 | .1196 | .125 | .1875 | .198 | .156 | 78.8 | 19/64 | 25 | 40 |
| 7 | .1793 | .1875 | .203 | .225 | .142 | 63.1 | 11/32 | 15 | 39 |
| 8 | .1793 | .1875 | .250 | .270 | .205 | 75.9 | 13/32 | 23 | 40 |
| 9 | .1793 | .1875 | .3125 | .340 | .265 | 77.9 | 1/2 | 25 | 42 |
| 10 | .1793 | .250 | .250 | .280 | .170 | 60.7 | 13/32 | 16 | 44 |
| 11 | .1793 | .250 | .3125 | .340 | .240 | 70.6 | 1/2 | 21 | 42 |
| 12 | .1793 | .250 | .375 | .400 | .340 | 85.0 | 5/8 | 27 | 37 |

Each of the foregoing examples embodies an abrasion-resistant rubber facing sheet of approximately 60 durometer composition, e. g., a product of Gates Rubber Company designated 60K. A sheet of this composition, of the thickness indicated, was vulcanized to one face of a hot-rolled, pickled and annealed low carbon steel backing plate of the thickness indicated for each of these examples. Medium or high carbon steels could be used instead of low carbon steel, but such harder steels increase the punching difficulties and are unnecessarily durable for my screen wherein the backing plate is protected by the rubber facing sheet. Where greater resistance to corrosion is desired, a backing plate formed from a suitable brass may be used or a suitable alloy steel plate, e. g., containing copper, may be used. However, since the metal backing must be capable of forming a good bond with the rubber face sheet, a metal such as aluminum is probably not suitable and a copper plate would be objectionable because it would react chemically with rubber.

The metal backing plate must be hard enough and tough enough so that it is capable of resisting the penetration of the punch dies until the latter have penetrated the tough rubber sheet to the surface of the backing plate. Otherwise, the essential downwardly flaring openings in the rubber sheet cannot be formed by punching procedure.

Within the range of sizes represented by the foregoing examples it is desirable to provide facing sheets which are approximately equal in thickness to the thickness of the backing plate. However, suitable rubber sheeting is not presently available in the thicknesses corresponding exactly to those of the available steel plate and I have found that excellent results are obtained by using facing sheets which are either approximately equal in thickness to the backing plate or slightly thicker than the backing plates to which they are bonded, as indicated by the foregoing table. It will also be evident from this table that in screens made with punch sizes ranging from .070 inch to .375 inch the diameters of the holes in the rubber facing sheets range from about 63% to about 85% of the diameters of the holes in the backing plates.

Tests of my improved screen indicate that when used in the screening of highly abrasive ferro silicon particles the useful life of the screen is approximately 600 hours, whereas, the ordinary punch plate screens used under the same conditions have a useful life of only about 144 hours. Because of this durability and the improved actual efficiency resulting from improved resistance to blinding, use of my screen results in large savings in cost of screening abrasive materials generally.

Improved efficiency of the screening is further due to the increase in the coefficient of sliding friction between my wear resistant rubber face sheet and the abrasive particles undergoing treatment. This coefficient of friction increases with wear whereas a steel surfaced punch plate screen becomes polished with use, with the result that the coefficient of friction decreases and screen efficiency declines. Tests of my improved screen further show that it produces improved dewatering effects as compared with woven wire screens of comparable size and efficiency. Specifically, my screen reduces the free moisture carry over to less than one percent as compared to a normal carry over of 2–3% moisture on wire cloth screens. Such reduction in the free moisture carry over is of great importance in heavy media processes where the moisture carry over adversely affects the control of the density of the medium in the separator.

This application is, in part, a continuation of my application Serial No. 200,085, now abandoned, filed in the United States Patent Office December 9, 1950.

I claim:

1. The process for making an abrasion-resistant and blinding-resistant screen for sizing granular materials which comprises preparing a steel backing plate and a face sheet comprising an elastic, flexible, abrasion-resistant rubber or rubber-like material of approximately 60 durometer hardness, then bonding said face sheet to the normally upper surface of said plate, then forming a multiplicity of downwardly flaring perforations in the face sheet and substantially straight perforations in the backing plate by a plurality of punching operations in the first of which the punch dies are forced through the face sheet and the backing plate and then withdrawn, and in the second of which the perforations in the face sheet are enlarged and the surfaces defining them given a smooth finish while employing the perforated backing plate as a die to receive the cuttings and while compressing the sheet material at the sides of the perforations whereby, when the punch dies are withdrawn after the second punching operation, the perforations at the normally upper side of said sheet are substantially reduced by expansion of the face material and said perforations are caused to flare downward to the perforations in the backing plate.

2. The process for making an abrasion-resistant and blinding-resistant screen for sizing granular materials which comprises, preparing a hard metal backing plate and a face sheet comprising an elastic, flexible, abrasion-resistant rubber or rubber-like material having a durometer hardness range of 57–62 inclusive, then bonding said face sheet to the normally upper surface of said plate, then forming a multiplicity of downwardly flaring perforations in the face sheet and substantially straight perforations in the backing plate by a plurality of punching operations in the first of which the punch dies are forced through the face sheet and backing plate and then withdrawn, and in the second of which the perforations in the face sheet are enlarged and finished while employing the perforated backing plate as a die to receive the cuttings and while compressing the sheet material at the sides of the perforations whereby, when the punch dies are withdrawn after the second punching operation, the perforations at the normally upper side of said sheet are substantially reduced by expansion of the face material and said perforations are caused to flare downwardly to the perforations in the backing plate.

References Cited in the file of this patent

UNITED STATES PATENTS

| | | |
|---|---|---|
| 1,220,232 | Jackson | Mar. 27, 1917 |
| 1,718,385 | Sherwood | June 25, 1929 |
| 1,862,633 | Ramsay | June 14, 1932 |
| 1,916,393 | Smith | July 4, 1933 |
| 1,974,465 | Lewis | Sept. 25, 1934 |